(12) United States Patent
Merkle (10) Patent No.: US 8,706,615 B2
(45) Date of Patent: Apr. 22, 2014

(54) SYSTEMS AND METHODS FOR EVALUATING THE ABILITY OF BORROWERS TO REPAY LOANS

(76) Inventor: Robert A. Merkle, Kennett Square, PA (US)

( * ) Notice: Subject to any disclaimer, the term of this patent is extended or adjusted under 35 U.S.C. 154(b) by 465 days.

(21) Appl. No.: 12/631,724

(22) Filed: Dec. 4, 2009

(65) Prior Publication Data

US 2011/0137788 A1    Jun. 9, 2011

(51) Int. Cl.
*G06Q 40/00* (2012.01)
*G06Q 40/02* (2012.01)

(52) U.S. Cl.
CPC .................................. *G06Q 40/025* (2013.01)
USPC ......................................................... 705/38

(58) Field of Classification Search
CPC .................................................. G06Q 40/025
USPC .................................................. 705/7.28, 38
See application file for complete search history.

(56) References Cited

U.S. PATENT DOCUMENTS

| | | | | |
|---|---|---|---|---|
| 5,832,465 | A * | 11/1998 | Tom | 706/51 |
| 5,852,811 | A | 12/1998 | Atkins | |
| 5,875,437 | A | 2/1999 | Atkins | |
| 6,064,972 | A * | 5/2000 | Jankowitz et al. | 705/7.28 |
| 6,112,190 | A * | 8/2000 | Fletcher et al. | 705/36 R |
| 6,999,942 | B2 * | 2/2006 | Kemper et al. | 705/38 |
| 7,194,431 | B1 * | 3/2007 | Land et al. | 705/30 |
| 7,296,734 | B2 | 11/2007 | Pliha | |
| 7,376,610 | B2 * | 5/2008 | Schneider | 705/36 R |
| 7,539,628 | B2 * | 5/2009 | Bennett et al. | 705/26.41 |
| 7,542,922 | B2 * | 6/2009 | Bennett et al. | 705/26.8 |
| 7,657,475 | B1 * | 2/2010 | Arpin et al. | 705/35 |
| 7,734,539 | B2 * | 6/2010 | Ghosh et al. | 705/38 |
| 7,778,856 | B2 * | 8/2010 | Reynolds et al. | 705/7.28 |
| 7,788,150 | B2 * | 8/2010 | Molloy et al. | 705/35 |
| 7,810,713 | B2 * | 10/2010 | Lal et al. | 235/377 |
| 7,818,233 | B1 * | 10/2010 | Sloan et al. | 705/36 R |
| 7,822,680 | B1 * | 10/2010 | Weber et al. | 705/38 |

(Continued)

FOREIGN PATENT DOCUMENTS

| | | |
|---|---|---|
| EP | 1816595 A1 | 8/2007 |
| JP | 2008-009757 A | 1/2008 |
| WO | 2007/090605 A1 | 8/2007 |

OTHER PUBLICATIONS

Coloradobiz, "Building value in your company: 7 things you must do to increase company value," 2008, Roundhouse Advisors, pp. 1.*

(Continued)

*Primary Examiner* — Kenneth Bartley
(74) *Attorney, Agent, or Firm* — Fox Rothschild LLP (57) ABSTRACT

Systems and methods are provided for evaluating the ability of a borrower to repay a potential or existing loan. The systems and methods can use daily cash flows of the borrower obtained from one or more transaction accounts of the borrower. The cash flows can correspond to a period preceding the time of the analysis, and can include the most recent cash flow information in the transaction account. The cash flows can be adjusted to account for seasonal and day to day variations in the cash flows. The adjusted or non-adjusted cash flows can be trended, and projections of the cash flows can be generated based on the trends. The projected cash flows can be evaluated to provide an indication of whether the cash flow of the borrower is and will remain sufficient to facilitate repayment of the loan.

8 Claims, 5 Drawing Sheets

(56) References Cited

U.S. PATENT DOCUMENTS

| | | | |
|---|---|---|---|
| 7,921,048 B2 | 4/2011 | Sloan et al. | |
| 7,979,335 B2* | 7/2011 | Schneider | 705/36 R |
| 2001/0037288 A1* | 11/2001 | Bennett et al. | 705/38 |
| 2001/0056399 A1* | 12/2001 | Saylors | 705/38 |
| 2002/0103730 A1* | 8/2002 | Perley et al. | 705/30 |
| 2002/0174006 A1* | 11/2002 | Rugge et al. | 705/10 |
| 2003/0093366 A1* | 5/2003 | Halper et al. | 705/38 |
| 2003/0135448 A1* | 7/2003 | Aguias et al. | 705/38 |
| 2003/0135450 A1* | 7/2003 | Aguais et al. | 705/38 |
| 2003/0163398 A1* | 8/2003 | Yoshioka et al. | 705/35 |
| 2003/0208439 A1 | 11/2003 | Rast | |
| 2003/0208468 A1* | 11/2003 | McNab et al. | 707/1 |
| 2004/0030624 A1* | 2/2004 | Nishimaki | 705/35 |
| 2004/0039688 A1* | 2/2004 | Sulkowski et al. | 705/38 |
| 2004/0059627 A1* | 3/2004 | Baseman et al. | 705/10 |
| 2004/0111346 A1* | 6/2004 | Macbeath et al. | 705/35 |
| 2004/0111359 A1 | 6/2004 | Hudock | |
| 2004/0111370 A1* | 6/2004 | Saylors et al. | 705/40 |
| 2004/0128186 A1* | 7/2004 | Breslin et al. | 705/10 |
| 2004/0215554 A1* | 10/2004 | Kemper et al. | 705/38 |
| 2004/0225545 A1 | 11/2004 | Turner et al. | |
| 2004/0225596 A1* | 11/2004 | Kemper et al. | 705/38 |
| 2005/0010506 A1* | 1/2005 | Bachann | 705/35 |
| 2005/0027645 A1* | 2/2005 | Lui et al. | 705/38 |
| 2005/0065872 A1 | 3/2005 | Moebs et al. | |
| 2005/0080701 A1* | 4/2005 | Tunney et al. | 705/35 |
| 2005/0165680 A1* | 7/2005 | Keeling et al. | 705/40 |
| 2005/0222931 A1* | 10/2005 | Mamou et al. | 705/35 |
| 2005/0240592 A1* | 10/2005 | Mamou et al. | 707/9 |
| 2005/0262014 A1* | 11/2005 | Fickes | 705/38 |
| 2006/0059073 A1* | 3/2006 | Walzak | 705/35 |
| 2006/0085325 A1 | 4/2006 | Jammal et al. | |
| 2006/0122930 A1* | 6/2006 | Jariwala | 705/38 |
| 2006/0161487 A1* | 7/2006 | Saxena et al. | 705/35 |
| 2006/0167772 A1* | 7/2006 | Zilberman | 705/35 |
| 2006/0212393 A1* | 9/2006 | Lindsay Brown | 705/40 |
| 2006/0224502 A1 | 10/2006 | McGowen | |
| 2006/0242047 A1* | 10/2006 | Haggerty et al. | 705/35 |
| 2007/0118393 A1* | 5/2007 | Rosen et al. | 705/1 |
| 2007/0262140 A1* | 11/2007 | Long, Sr. | 235/380 |
| 2007/0288355 A1* | 12/2007 | Roland et al. | 705/38 |
| 2008/0021801 A1* | 1/2008 | Song et al. | 705/35 |
| 2008/0126267 A1* | 5/2008 | Rosen et al. | 705/36 R |
| 2008/0249925 A1* | 10/2008 | Nazari et al. | 705/38 |
| 2008/0270292 A1 | 10/2008 | Ghosh et al. | |
| 2009/0006230 A1 | 1/2009 | Lyda et al. | |
| 2009/0048885 A1* | 2/2009 | Bishop et al. | 705/7 |
| 2009/0076884 A1 | 3/2009 | Johnson et al. | |
| 2009/0089205 A1 | 4/2009 | Bayne | |
| 2009/0171723 A1 | 7/2009 | Jenkins | |
| 2009/0187482 A1* | 7/2009 | Blount et al. | 705/14 |
| 2009/0222357 A1* | 9/2009 | Bennett et al. | 705/26 |
| 2009/0254477 A1* | 10/2009 | Kramer | 705/40 |
| 2009/0299911 A1 | 12/2009 | Abrahams et al. | |
| 2010/0268641 A1* | 10/2010 | Kemper et al. | 705/38 |
| 2011/0145116 A1* | 6/2011 | Lawson et al. | 705/34 |
| 2011/0276466 A1* | 11/2011 | Bennett et al. | 705/38 |

OTHER PUBLICATIONS

International Search Report from PCT/US2010/056201 dated Jun. 30, 2011.

* cited by examiner

FIG. 1

Sample risk ratings based on borrower cash flows only.
Risk rating 1 is the best possible and 9 is the worst possible rating.

| In flow | Out Flow | Free Cash | Segment characteristic | Sample Risk Rating |
|---|---|---|---|---|
| Positive | Positive | Positive | Increasing growth rate and free cash | 1 |
| Positive | Positive | Negative | Increasing growth rate with expenses growing faster, heading for trouble | 7 |
| Positive | Positive | Flat | Increasing growth rate and expenses in direct proportion | 4 |
| Positive | Negative | Positive | Increasing growth rate and decreasing expenses, accelerating free cash | 1 |
| Positive | Negative | Negative | Recovery: Increasing growth rate, decreasing expenses, still not positive free cash | 6 |
| Positive | Negative | Flat | Recovery from excessive expense growth: Increasing growth rate, decreasing expenses, flat free cash | 3 |
| Positive | Flat | Positive | Increasing growth with no expense increase | 1 |
| Flat | Positive | Negative | No growth with increasing expenses, reducing free cash flow | 8 |
| Flat | Negative | Positive | No growth and reducing expenses to increase free cash | 3 |
| Flat | Flat | Flat | No growth in any area | 5 |
| Negative | Positive | Negative | Growth decline combined with expense increase forcing free cash down | 9 |
| Negative | Negative | Positive | Growth decline with faster expense decline creating free cash growth | 2 |
| Negative | Negative | Negative | Growth decline with slower expense decline creating free cash decline | 9 |
| Negative | Negative | Flat | Growth decline with fast enough expense decline to hold free cash flow steady | 7 |
| Negative | Flat | Negative | Growth decline with no expense change shrinking free cash | 9 |
| Positive Change | Positive Change | Positive Change | Positive Watch accounts – one or more of the cash flows has exceeded its corresponding projection by a statistically significant amount | Monitor account and contact customer – positive rating change possible |
| Negative Change | Negative Change | Negative Change | Negative Watch accounts – one or more of the cash flows has dropped below its corresponding projection by a statistically significant amount | Monitor account and contact customer – negative rating change possible |

FIG. 2

Risk factors based on combined borrower and trading partner cash flow patterns

|  | Borrower cash flow growing | Borrower cash flow stable | Borrower cash flow decreasing |
|---|---|---|---|
| Customer cash flow growing | Positive risk factor | Positive risk factor | Neutral risk factor |
| Customer cash flow stable | Positive risk factor | Neutral risk factor | Negative risk factor |
| Customer cash flow decreasing | Neutral risk factor | Negative risk factor | Negative risk factor |

The "Customer" is a key customer of the borrower, meaning it supplies a high percentage of the total cash flow to the borrower.

SYSTEMS AND METHODS FOR EVALUATING THE ABILITY OF BORROWERS TO REPAY LOANS

TECHNICAL FIELD

The present embodiments and methods relate generally to financial analyses, and more specifically to systems and methods for evaluating the ability of a borrower to repay a loan based on past and projected cash flows of the borrower and other factors relating to the operating condition of the borrower.

BACKGROUND

Financial institutions such as banks lend money to commercial borrowers (businesses) with the expectation that the cash flow of the business will generate the cash needed to repay the loan, as well as the cash needed to operate the business. The capacity of the borrower to repay the loan is thus related to its cash flow. In addition, banks usually consider the character of the borrower, which is an indicator of the effort and desire that can be expected of the buyer in repaying the loan. Banks also typically consider the collateral offered by the borrower. Collateral is a safety feature that helps to reimburse the bank in the event the borrower does not generate sufficient cash to repay the loan. Collateral is intended as a secondary, rather than the primary source of repayment.

Banks rely on the cash flow of the business for the primary source of loan repayment. Despite this, banks generally have no timely, ongoing measure of the cash flow of commercial borrowers that would permit the bank to monitor the risk of a loan repayment over its life. Moreover, banks commonly evaluate the cash flow of the borrower based on a financial statement of the borrower available at the time the bank is deciding whether to make the loan. This is not a timely means of analysis, because financial statements are typically issued about 60 days or more after the end of the period covered by the statement. Thus, the bank is likely making its loan decision based on cash flow information more than two months old superimposed by simplifying assumptions and projections.

Moreover, while the financial statement contains financial information, it may not directly provide a statement of the cash flow of the business. Thus, the financial statement may need to be analyzed to determine the cash flow. Because the cash flow information is usually out of date by at least two months, the analysis is often not done. Instead, banks commonly attempt to offset their lack of good cash flow information for the borrower by monitoring the balance in the borrower's checking account using predetermined target value (s). If the balance is less than a target value, the borrower is considered a risk with respect to its ability to repay the loan.

Evaluating the suitability of a potential borrower based on a target checking-account balance value is not an optimal means for conducting such an evaluation. For example, the checking-account balance may decrease as the cash flow of the borrower decreases, but may not to drop below the target balance. Borrowers that manage their business tightly can adjust their daily cash needs to preserve the balance above the minimum, yet may not have the capacity to repay the loan as promised.

Moreover, the checking-account balance of a business can drop below the target balance for reasons which actually reflect favorably on the financial condition of the business. For example, the checking-account balance of a business typically drops as the business's growth is accelerating. Thus, rather than reflecting an unfavorable condition, a relatively low checking-account balance in this situation can actually be a positive factor reflecting a situation that can lead to an increase in the capacity of the business to repay the loan. As another example, while a new product is being designed and built by a business, cash is consumed without a corresponding cash inflow because the product has not yet been sold or delivered. Thus, the checking account balance of the business may decrease due to a factor that will subsequently lead to an increase in the capacity of the business to repay the loan.

SUMMARY

Systems and methods are provided for evaluating the ability of a borrower to repay a potential or existing loan. The systems and methods can use daily cash flows of the borrower obtained from one or more transaction accounts of the borrower. The cash flows can correspond to a period preceding the time of the analysis, and can include the most recent cash flow information in the transaction account. The cash flows can be adjusted to account for seasonal and day to day variations in the cash flows. The adjusted or non-adjusted cash flows can be trended, and projections of the cash flows can be generated based on the trends. The projected cash flows can be evaluated to provide an indication of whether the cash flow of the borrower is and will remain sufficient to facilitate repayment of the loan.

Customers and suppliers (vendors) of the borrower can be identified, and cash flow patterns within the customer-borrower-supplier chain can be identified and evaluated to provide a further indication of whether the cash flow of the borrower is and will remain sufficient to facilitate repayment of the loan. Moreover, customer and vendor relationships among some or all of the entities having accounts at the lending institution can be identified and mapped to show businesses that are connected in broad supply chains. The trading relationships can be evaluated to help identify substantial systemic risks in the loan portfolio that may not be evident otherwise, and can thereby be used to help evaluate the value of the loan portfolio. The relationships can also be used to identify potential candidates for additional loans.

Methods for evaluating the ability of a borrower to repay a loan comprise determining a trend of cash flow for the borrower over a past period of time based on information stored in one or more transaction accounts of the borrower. The methods also comprise projecting the cash flow of the borrower over a period of time subsequent to the past period of time based on the trend of cash flow for the borrower over the past period of time, and classifying the borrower as belonging to a predetermined risk group based on the projection of the cash flow and a predetermined criterion.

Other methods for evaluating the ability of a borrower to repay a loan comprise identifying customers and/or vendors of the borrower based on information stored in one or more transaction accounts of the borrower. The methods also comprise classifying the customers and/or vendors by industry, and determining key customers and/or vendors with which the borrower has the highest flows of cash in relation to the other customers and/or vendors of the borrower in accordance with a predetermined criterion, and determining trends of cash flows between the borrower and the customers and/or vendors based on the financial information stored in the transaction accounts.

The methods further comprise assessing one or more of: the number of the key customers of the client; the growth pattern of the cash flow of the borrower from the key customers; the growth pattern of the industry or industries of the key customers; the multiple of the net cash flow of the borrower to the sum of the fixed and financing costs of the borrower; whether the projected cash inflow and outflow are moving commensurately to within a predetermined criterion; the length of time the current management team of the borrower has been in place; and the personal risk score of the current management team of the borrower.

Methods for evaluating a loan portfolio of a financial institution comprise determining the trend of cash flow for each borrower in the loan portfolio over a past period of time based on information stored in transaction accounts of the financial institution. The methods further comprise projecting the cash flows for each borrower over a period of time subsequent to the past period of time based on the pattern of cash flow for the borrower over the past period of time, and classifying each borrower as belonging to a predetermined risk group based on the projection of the cash flow for the borrower and a predetermined criterion.

Systems for evaluating the ability of a borrower to repay a loan comprise a computing device. The computing device comprises a processor, memory communicatively coupled to the processor, and computer-executable instructions stored on the memory. The computer-executable instructions, when executed on the processor, cause the computing device to: determine a trend of cash flow for the borrower over a past period of time based on information stored in one or more transaction accounts of the borrower; project the cash flow of the borrower over a period of time subsequent to the past period of time based on the trend of cash flow for the borrower over the past period of time; and classify the borrower as belonging to a predetermined risk group based on the projection of the cash flow and a predetermined criterion.

Other systems for evaluating the ability of a borrower to repay a loan comprise a computing device. The computing device comprises a processor, memory communicatively coupled to the processor, and computer-executable instructions stored on the memory. The computer-executable instructions, when executed on the processor, cause the computing device to: identify customers and/or vendors of the borrower based on information stored in one or more transaction accounts of the borrower; classify the customers and/or vendors by industry; determine key customers and/or vendors with which the borrower has the highest flows of cash in relation to the other customers and/or vendors of the borrower in accordance with a predetermined criterion; and determine trends of cash flows between the borrower and the customers and/or vendors based on the financial information stored in the transaction accounts.

The computer-executable instructions, when executed on the processor, also cause the computing device to assess one or more of: the number of the key customers of the client; the growth pattern of the cash flow of the borrower from the key customers; the growth pattern of the industry or industries of the key customers; the multiple of the net cash flow of the borrower to the sum of the fixed and financing costs of the borrower; whether the projected cash inflow and outflow are moving commensurately to within a predetermined criterion; the length of time the current management team of the borrower has been in place; and the personal risk score of the current management team of the borrower.

Systems for evaluating a loan portfolio of a financial institution comprise comprising a computing device. The computing device comprises a processor, memory communicatively coupled to the processor, and computer-executable instructions stored on the memory. The computer-executable instructions, when executed on the processor, cause the computing device to: determine the trend of cash flow for each borrower in the loan portfolio over a past period of time based on information stored in transaction accounts of the financial institution; project the cash flows for each borrower over a period of time subsequent to the past period of time based on the pattern of cash flow for the borrower over the past period of time; and classify each borrower as belonging to a predetermined risk group based on the projection of the cash flow for the borrower and a predetermined criterion.

DRAWINGS

The foregoing summary, as well as, the following detailed description of preferred embodiments, are better understood when read in conjunction with the appended diagrammatic drawings. The drawings are presented for illustrative purposes only, and the scope of the appended claims is not limited to the specific embodiments shown in the drawings. In the drawings:

FIG. 2 is a table depicting various relationships between cash flows of a borrower and risk groups to which the borrow may be assigned;

DETAILED DESCRIPTION

Systems and methods are provided for evaluating the ability of borrowers to repay potential or existing loans. In an exemplary method 10 described herein and shown in FIG. 1, the source of the loan is a bank, and the borrower is a company, such as a corporation, limited liability company, partnership, etc., that is applying for a commercial loan from the bank. A bank and a company are specified as the lender and borrower in the exemplary method disclosed herein for exemplary purposes only. The method can be applied to lenders other than banks, including but not limited to savings banks, credit unions, investment banks, commercial finance companies, and to borrowers other than companies, including but not limited to individuals seeking a personal loan.

The company seeking the loan has one or more transaction accounts with the bank from which the loan is sought or a separate bank. The bank, therefore, has access to the financial information in the accounts because it maintains the accounts or the prospective borrower has made the data available from accounts at a different bank. For the purposes of describing the exemplary method disclosed herein, the company seeking the loan is considered to have one transaction account at the bank. The company may or may not have one or more existing loans from the bank.

The term "transaction account," as used herein, can refer to a wide range of account and fund types available at the bank, including but not limited to the following types of accounts and funds: checking; savings; money market; demand deposit (DDA); negotiable order of withdrawal (NOW); payable through drafts; lockbox; wire; and automatic clearing house (ACH).

In the exemplary embodiment and method described herein, the transaction account from which the financial information is obtained is a primary checking account of the company. A lending bank generally requires its business borrowers to maintain their primary checking account at the bank. If good cash management practices are in place at the company, all or most of the cash flow of the company flows through this account because it is the best, or one of the best ways for the company's management team to monitor the cash that is available to the company to meet its cash needs and to invest daily to maximize profits. Tracking the movement of cash within this account can therefore provide a daily picture of the company's cash flow.

Figure 1:
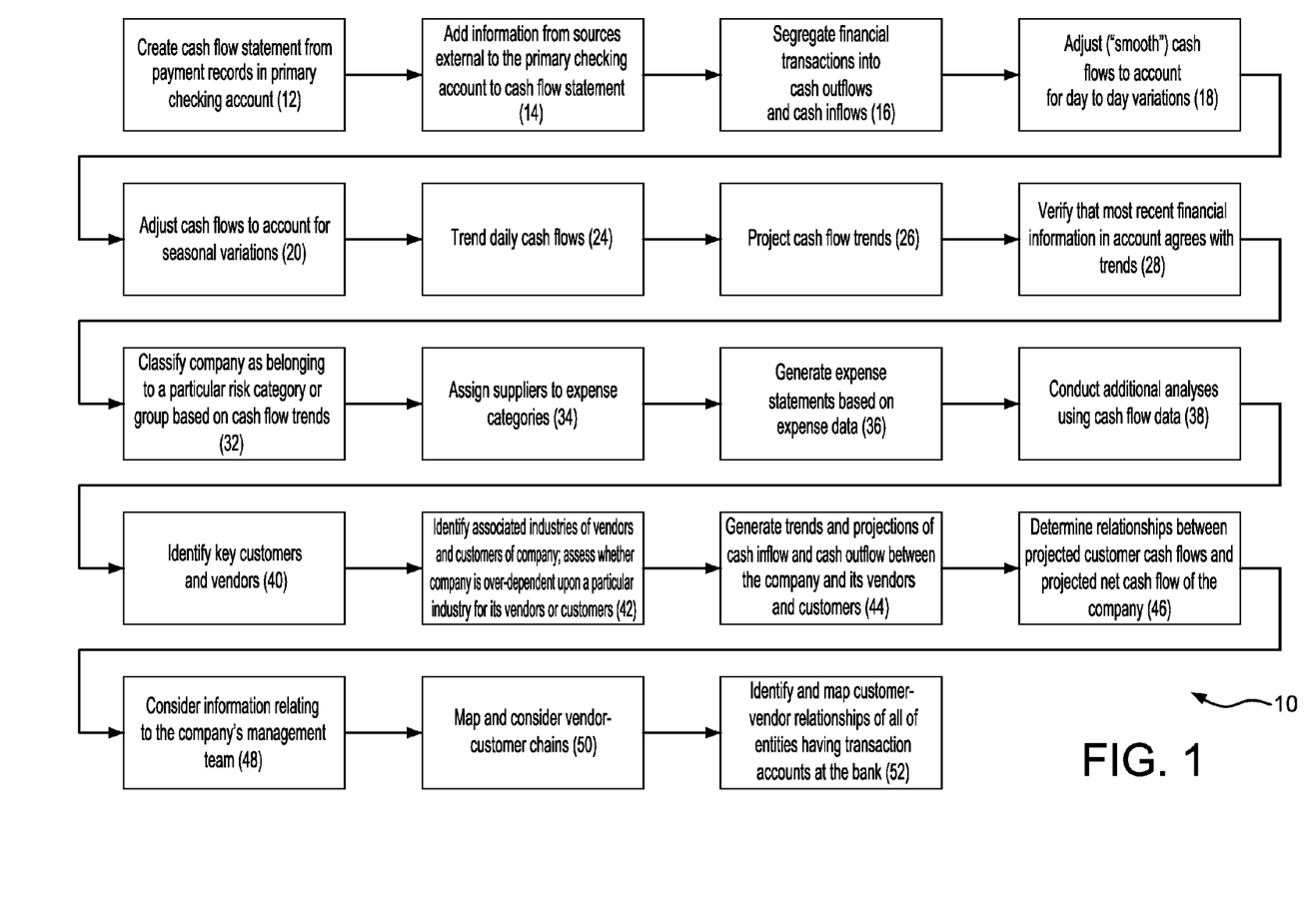
FIG. 1 is a flow diagram depicting a method for evaluating the ability of a borrower to repay a loan.

A cash flow statement can be created from the payment records in the company's primary checking account with the bank (activity 12 in FIG. 1). A payment record, as that term is used herein, is considered the electronic image of a financial transaction, and can include actual images if such images are used as part of the payment process. The payment records can be obtained from all types of payments systems, including but not limited to: ACH, check, credit card, wire, electronic data interchange (EDI), lockbox, etc. In addition, payment records can be obtained from other sources such as Positive Pay data.

The data extracted from each payment record can include, without limitation, the routing number and account number of the paying bank; the identities of the payor; and the date and amount of the payment. The extracted data can be stored in a data base residing on a computing system of the bank or a third party such as a service bureau. The noted data can be extracted based on knowledge of the particular type of data that resides in each field of the payment record. This knowledge will reside within the bank if the payment record is generated by the bank itself. If the payment record is generated by a source other than the bank, the knowledge can be obtained from industry-standard data provided by the organization governing the payment process, or through the use of an optical character recognition (OCR) engine to extract the desired data from an image of the payment document.

Some of the desired data may not be available within each payment record. For example, the payor and other details of the transaction may not be available in payment records associated with credit-card transactions because such transactions are deposited as a total by the credit-card processor; or if a payment service such as lockbox is not provided by the bank.

The completeness of the data available in the payment records of the bank is dependent upon how successful the bank has been in providing all of the payment services required by the company and its negotiation with the borrower for access to data not under the control of the bank. The completeness of the payment information is also dependent upon the nature of the company's business. In particular, more complete data will generally be available for companies whose payments are based primarily on business-to-business, rather than business-to-consumer transactions. If relatively little payment data is available for the company, the cash flow statement for the company will include relatively little data on the customers and vendors of the company, which can limit the scope of the analysis of the operating condition of the company.

The cash flow statement can include financial information spanning a time period beginning at a predetermined point prior to the time of the analysis, e.g., three years, and ending a point coinciding with the time which the most recent information was posted to the account. Alternatively, the cash flow statement can include financial information dating from and through the inception of the account. The financial information chosen for use as the basis of the cash flow statement is hereafter referred to as "historical information" or "historical data."

Additional information from sources external to the primary checking account can be added to the cash flow statement (activity 14 in FIG. 1). For example, the cash flow statement can include the size of the company, the industry with which the company is associated, the identities of the officers and directors of the company and other information regarding the company's management team, and similar information regarding the customers and vendors (suppliers) of the company.

The financial transactions reflected in the company's primary checking account can be analyzed and segregated into cash outflows, i.e., payments, from the account, and cash inflows, i.e., deposits, to the account (activity 16). A total (aggregated) cash inflow and a total cash outflow for each day can be calculated for each day for which information is available. The cash outflow can exclude cash outflows associated with withdrawals made to third parties, i.e., withdrawals associated with investments and affiliates of the company, at the user's discretion. The cash inflow likewise can exclude cash inflows associated with investments and affiliates of the company at the user's discretion. A net cash flow into or out of the company for each day can be calculated by subtracting the total cash outflow for that day from the total cash inflow for that day.

The net or free cash flow, total cash inflow, and/or total cash outflow for each day of the analysis period (hereinafter referred collectively to as "the daily cash flows") can be adjusted, or "smoothed," to account for day to day variations therein, using a suitable statistical technique such as multi-day averaging (activity 18).

The daily cash flows can also be adjusted to account for seasonal variations therein (activity 20). For example, sales in the toy industry typically cycle throughout the year, reaching a seasonal high in the fall and a seasonal low in the winter. A suitable statistical analysis technique such as X-12-ARIMA can be applied to the historical data to determine an adjustment factor that accounts for the average seasonal variation over the historical period. The adjustment factor can be applied to the historical financial information to distribute the cash flow over a given year so as to account for the seasonal variations. The seasonal adjustment can be applied to the smoothed cash flow determined in activity (18). Alternatively, the seasonal adjustment can be applied to the original non-adjusted or "unsmoothed" cash flows. The seasonal adjustment can account for seasonal variations on a quarterly, monthly, or other suitable basis.

The daily cash flows can be trended, and the trends can be used to project the cash flows into the future, i.e., past the time coinciding with the most recent information in the primary checking account of the company (activities 24 and 26, respectively, in FIG. 1). The trends can be based on the historical cash flows adjusted in the above manners to account for day to day and seasonal variations. The trends can be generated using a suitable technique, such as the application of a least squares fit, to the adjusted historical cash flows. The trends can be based, in the alternative, on the unadjusted historical cash flows, or on the historical cash flows adjusted to account for one, but not both of the day to day and seasonal variations.

The most recent financial information in the company's primary checking account can be checked to verify that it agrees with the trends (activity 28). For example, the daily cash flows from a predetermined recent time period, e.g., the most recent four weeks over which the financial information was added to the transaction account, can be analyzed to determine whether they agree with the corresponding projections to within a predetermined criterion. The predetermined criterion can be, for example, a statistically significant variance of the cash flows, such as the standard deviation of the cash flows. The lack of agreement can be favorable, i.e., one or both of the cash inflow and net cash flow can exceed the corresponding trends and/or the cash outflow can be lower than the corresponding trend. The lack of agreement can also be unfavorable, i.e., the cash outflow can exceed the corresponding trend, and/or one or both of the cash inflow and net cash flow can be lower that the corresponding trends.

The lack of agreement between the actual cash flows and the corresponding trends within the predetermined criteria can be interpreted as an indication that the financial performance of the entity has changed over the recent time period, and that the trends may not reflect the current cash flow characteristics of the company. If the lack of agreement is favorable, the bank may wish to consider making additional loans to the company. If the lack of agreement is unfavorable, the bank may consider conducting an in-depth evaluation of the company to determine the reason for the apparent change in the financial performance thereof, e.g., reviewing recent sales, collections and other data with the company management. Moreover, in situations where the company has an existing loan with the bank, the financial performance of the company can be monitored closely by the bank on a going-forward basis.

If the recent cash flows match their corresponding trends within the predetermined criteria, the trends can be considered a satisfactory indication of the present cash flow characteristics of the company. The trends can be projected into the future, i.e., past the time at which the analysis is being conducted, by an amount of time chosen by the analyst (activity 26), selecting the appropriate period for the analysis based on the payment terms of the loan.

The projected cash flow trends can be evaluated, and based on the evaluation, the company can be classified as belonging to a particular risk category or group for the purposes of evaluating the ability of the company to repay a loan (activity 32). FIG. 2 is a table denoting how the various relationships between cash inflow, cash outflow, and net cash flow can be used as indicators of the particular risk category within which the company should be grouped. The risk category, in turn, can be used as an indication of the ability of the company to repay the loan.

For example, as shown in FIG. 2, the financial information may indicate a positive trend in both daily cash inflow and daily cash outflow coupled with a negative trend in daily net cash flow. This set of conditions indicates that, while the company's growth rate is increasing, its expenses are increasing at a faster rate. Thus, it is likely that the operating condition of the company is or will be unfavorable based on the current trends and the company should be considered at risk in its ability to repay the loan.

In another example, daily cash inflow is trending negative, the trend of daily cash outflow is flat (no change), and the net cash flow is trending negative. This set of conditions indicates that the growth of the company is in decline while the expenses of the company are not changing, resulting in a decrease in net cash flow. Thus, it is likely that the operating condition of the company is or will be unfavorable based on the current trends and the company should be considered at risk in its ability to repay the loan.

In another example, daily cash inflow is trending positive, the trend of daily cash outflow is flat, and the net cash flow is trending positive. This set of conditions indicates that the company is growing without an increase in its expenses, resulting in an increase in net cash flow. Thus, it is likely that the operating condition of the company is or will be favorable based on the current trends and the company should be considered a favorable risk with respect to repayment of the loan.

The expenses and income sources of the company can be identified and analyzed as follows, to further assess the operating condition of the company and its ability to repay the potential or existing loan. Customers of the company can be identified by determining the sources of cash inflows to the company based on information obtained from the company's primary checking account and included on the cash flow statement. Vendors (suppliers) of the company can be identified by determining the entities receiving cash outflows from the company based on information obtained from the primary checking account included on the cash flow statement.

The Standard Industry Code (SIC) or North American Industry Classification System (NAICS) code can be determined for each vendor and customer. The SIC or NAICS code can be used to assign the cash outflow to each supplier to a particular expense category, e.g., rent, labor, insurance, legal financing, taxes and other government expenses, material (by broad types), etc. (activity 34). Each expense category can be classified as a fixed or variable expense automatically based on the SIC or NAICS code, by manual input from an operator or analyst, or by other suitable means.

Expense statements can be generated based on the expense data (activity 36). The expense statements can include individual expense categories such as financing costs, fixed expenses, and other cost factors chosen by the analyst. The mix of expenses of the company, including the number of vendors of the company and the mix of their associated industries, can be reviewed and compared to norms in the industry with which the company is associated. Deviations from the industry norms can be evaluated for their potential effect on the operating condition of the company.

The expense statements can include past and recent payments made to principals, i.e., key officers and directors, of the company. These payments can be evaluated to identify trends that may help provide an indication of the operating condition of the company. For example, a recent, rapid acceleration in such payments may indicate that the principals are preparing for a period of high-risk or a weakening of the operating condition of the company by removing assets from the company. Moreover, payments between the company and its principals, other than normal compensation, can be mapped and evaluated to determine whether the company should be monitored for insider dealing.

Payment information on the cash flow statement, e.g., the size and frequency of the payments, can be used to determine when the bank needs to report a particular transaction under the Bank Secrecy Act and other regulatory reporting systems, provided a baseline for such reporting, e.g., transaction amount, transaction frequency, etc., has been established by the bank.

The information contained in the cash flow statement can be combined with other data, such as the credit score of key individuals within the company, independent data on the health of the industry with which the company and/or its key customers are associated, etc., to create a credit score for the company.

Various analyses can be performed using the expenses and the current and projected cash flows for the company to further evaluate the operating condition of the company and its ability to repay a potential or existing loan (activity 38). For example, one or more of the following factors can be calculated and evaluated:

how many times the daily net cash flow of the company will cover the financing costs and principal of the loan over the loan period, with and without the fixed costs of the company factored into the analysis;

how long the daily net cash flow will continue to be sufficient to cover the financing costs and principal under the current projection for daily net cash flow, with and without the fixed costs of the company factored in;

how long the daily net cash flow under the current projection, combined with any available cash balances of the company, will be sufficient to cover the financing costs and principal, with and without the fixed costs of the company factored in (the term "cash balance," as used herein, refers to all sums available to the company in the form of account balances and investments);

the ability of the company to pay additional financing costs under the current and projected daily net cash flows, with and without the fixed costs of the company factored in;

the ability of the company to pay additional financing costs under the current and projected daily cash flows combined with any available cash balances, with and without the fixed costs of the company factored in; and whether the projected cash inflow and outflow are moving commensurately to within a predetermined criterion, with an acceptable lag therebetween.

The percentage of the total cash inflow coming from each individual customer of the company can be calculated based on information obtained from the company's primary checking account. The percentage of the total cash outflow going to each individual vendor can likewise be calculated. Key customers can be identified as the largest sources of cash flow that, in the aggregate, provide a predetermined percentage, e.g., 80 percent or more, of the total cash inflow to the company. Key vendors can be identified as the largest receivers of cash outflow that, in the aggregate, receive a predetermined percentage, e.g., 80 percent or more, of the total cash outflow of the company (activity 40).

Reliance by the company on a relatively small number of key customers or vendors, which can increase the risk that the company will be unable to repay a loan, can be assessed once the key customers and vendors have been identified.

The industries with which each of the company's vendors and customers is associated can also be identified, and an assessment of whether the company is over-dependent upon a particular industry for its vendors or customers can be made (activity 42). This assessment can be made with respect to the company's key vendors and customers only, in the alternative. Moreover, economic information relating to the growth of the industries of the key vendors and customers can be made to further assess the potential effect of the company's vendors and customers on the company's loan-repayment capacity.

Trends and projections of the cash inflow or cash outflow between the company and its vendors and customers can be generated using the cash flow information associated with each vendor and customer in the company's cash flow statement (activity 44). The trends and projections can be generated using the techniques described above for trending and projecting the cash flows of the company. The trends can be adjusted to account for one or both of the day to day and seasonal variations therein, in the above-described manner. The trends and projections can be generated for every vendor and customer of the company or, alternatively, for the key vendors and customers only.

The relationships between the projected customer cash flows and the projected net cash flow of the company can be determined and used as a further indication of the operating condition of the company and its ability to repay a potential or existing loan (activity 46). This analysis can be conducted for each key customer of the company, for all of the key customers in the aggregate, or for all of the customers in the aggregate.

Figure 3:
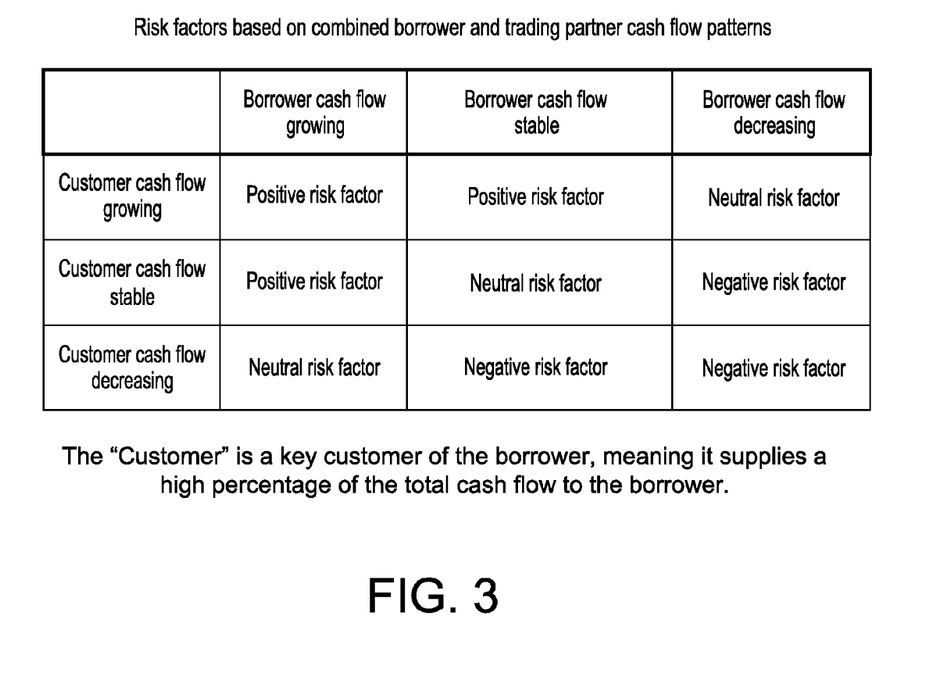
FIG. 3 is a table depicting various relationships between cash flows of a borrower and a customer of the borrower, and the health of the customer-borrower relationship.

FIG. 3 is a table depicting various possible relationships between the projected net cash flow of the company and the projected customer cash flows to the company. The table also depicts the potential effect of each possible relationship on the operating condition of the company. For example, a stable net cash flow for the company accompanied by a decreasing customer cash flow is a potential negative indication of the company's operating condition and its loan-repayment capacity. Conversely, a stable cash flow for the company combined with an increasing cash flow from the customer is a potentially positive indication of the company's operating condition and its loan-repayment capacity.

The above information can be combined with information relating to the management team of the company to further assess the operating condition of the company and its ability to repay a potential or existing loan (activity 48). For example, management-related factors such as the length of time the current management team has been running the company, and the personal risk (FICO) score of the management team can be considered. Similar information for the key vendors and customers of the company, if available, can also be considered.

The vendor-customer chains of which the company is part can be mapped and considered as a whole to provide a further indication of the operating condition of the company and its ability to repay a potential or existing loan (activity 50). Due to the interdependencies of the businesses within such chains, the operating condition of a business within a chain most likely is favorable if the net cash flow of many or all of the members in the chain is growing, and if few or none of the key customers of the business have a deteriorating cash flow. For example, increasing growth in a key customer at the bottom of a chain can potentially result in growth of all the members of the chain. Thus, the bank may wish to market additional loans to the other members of the chain in this situation. Conversely, deceasing growth in a key customer at the bottom of a chain can adversely affect the operating condition of all other the members of the chain. The bank, therefore, may wish to increase the risk rating and/or reduce its loan exposure in relation to the members of the chain in this situation.

Moreover, if information relating to vendors and customers of the company's vendors and customers is available through the records of the bank or other sources, the customer-vendor chains can be extended to include these additional entities.

The customer-vendor relationships of all of the entities having transaction accounts at the bank can be identified and mapped (activity 52). This mapping can potentially reveal previously-unknown customer to customer, vendor to vendor, customer to vendor, and other trading relationships that can directly and indirectly affect the operating condition of the company being evaluated. This information can be used to identity additional factors reflective of the operating condition of the company, such as an over-dependence of its key vendors or customers on a relatively small number of their own customers or vendors, or on a particular industry.

The mapping information can also be used by the bank to identify vendors, customers, and other entities that reside in favorable customer-vendor chains, and may thus be good candidates for additional loans from the bank. Conversely, the mapping information can reveal at-risk businesses which should not be considered for new loans, or which should be monitored closely to assess their capacity to repay an existing loan.

The mapping information can also be used by the bank to value and evaluate the health of its overall loan portfolio. For example, the information can potentially provide an indication of whether the loan portfolio is over-dependent upon a particular industry or trading network. The information can also be used to provide an indication of whether the loan portfolio is over-dependent upon borrowers having highly-concentrated vendor or customer relationships or other associated risk factors. The mapping can also reveal whether a significant amount of its borrowers do business with each other, which could represent a systemic risk in the loan portfolio.

Moreover, the above-described techniques for trending and analyzing the cash flows and evaluating the financial health of the company can be applied by the bank to some or all of its borrowers to help value the bank's loan portfolio. In particular, the ability of each borrower to make future loan payments can be determined based on the projections of the net cash flow of the borrower determined using the above-described techniques, plus the current cash balance of the borrower. The market value of the loan portfolio and its individual risk segments can be determined based on the aggregated number of future loan payments that can be made by the borrowers, using portfolio valuation techniques that calculate the current value of a series of future cash flows.

Figure 4:
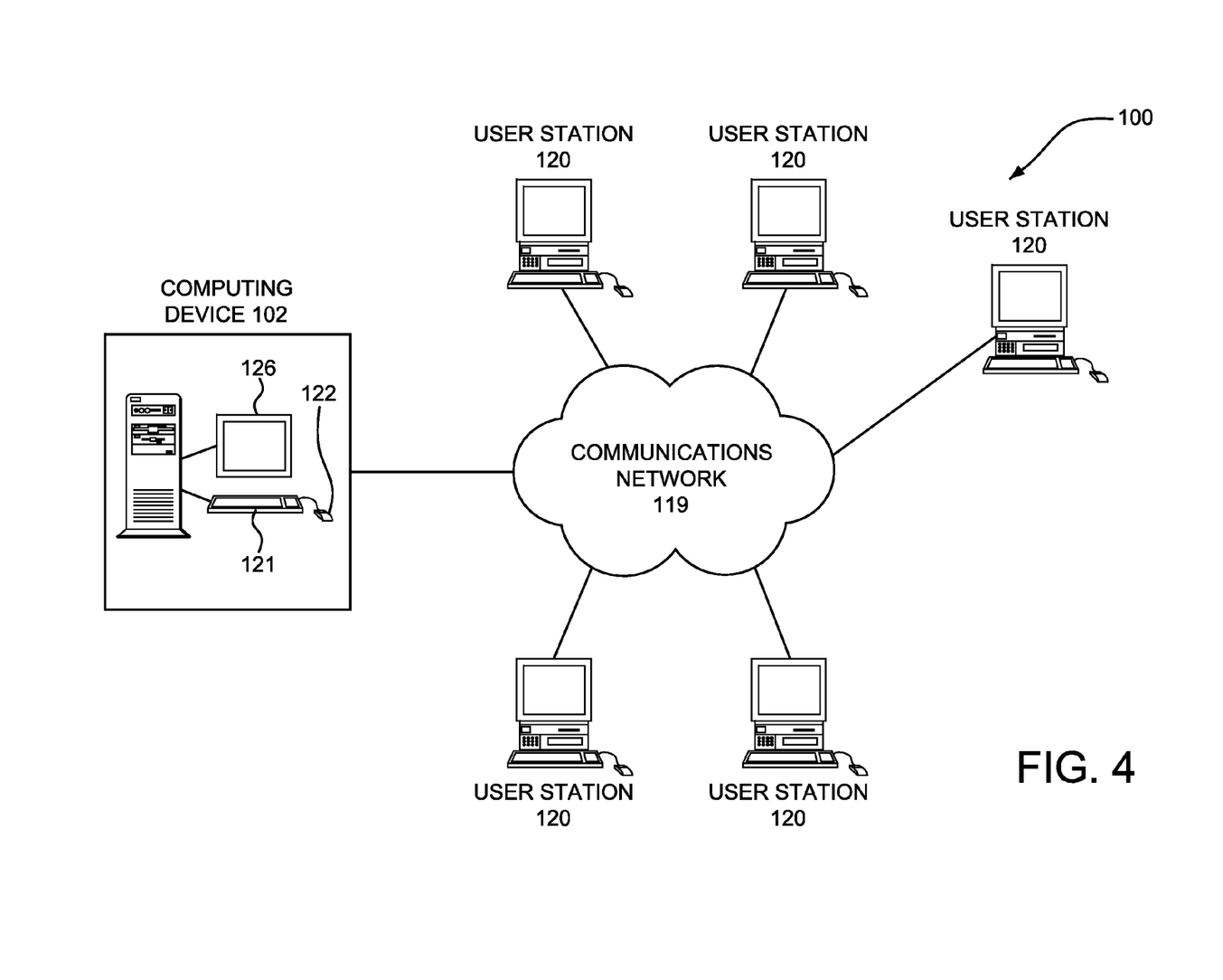
FIG. 4 is a diagrammatical illustration of a system capable of evaluating the ability of a borrower to repay a loan.
Figure 5:
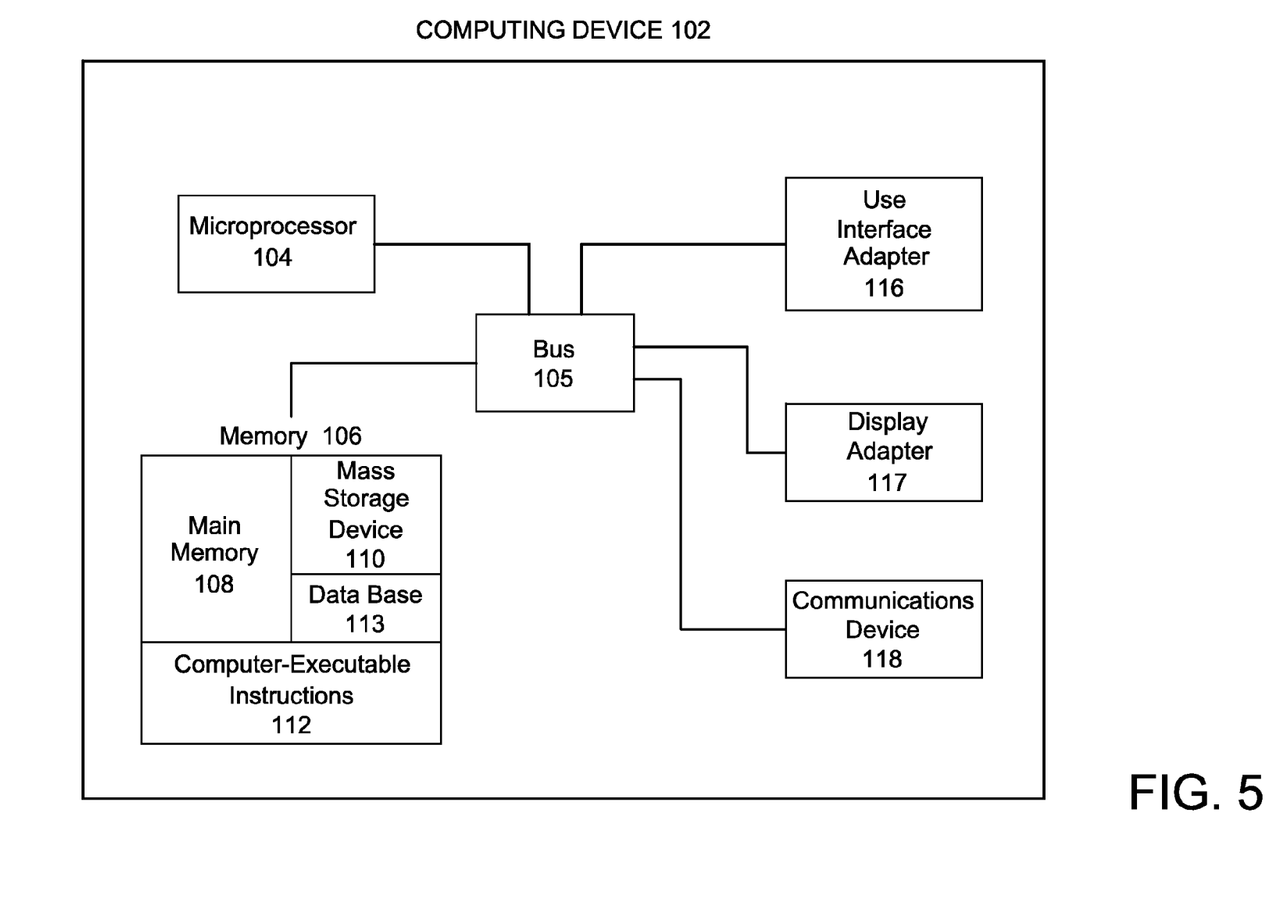
FIG. 5 is a block diagram of a computing device of the system shown in FIG. 4.

FIGS. 4 and 5 depict a system 100 that is capable of evaluating the ability of borrowers to repay potential or existing loans in accordance with the above-described methods. The system 100 comprises a computing device 102. The computing device 102 can be, for example, a personal computer (PC), a server, a mainframe, a work station, a minicomputer, or other suitable type of computing device. The system 100 can be a stand-alone system whose sole function is to evaluate the ability of borrowers to repay potential or existing loans in accordance with the above methods. Alternatively, the system 100 can be part of the computer system of the lending institution, programmed to evaluate the ability of borrowers to repay potential or existing loans in accordance with the above methods as one of its functions.

The computing device 102 can comprise a processor such as a microprocessor 104, and a bus 105 that facilitates communication between the microprocessor 104 and various other components of the computing device 102, as shown in FIG. 5.

The computing device 102 can also include memory 106. The memory 106 can comprise a main memory 108 and a mass storage device 110, each of which is communicatively coupled to the microprocessor 104 by way of the bus 105. The main memory 108 can be, for example, random access memory. The mass storage device 110 can be, for example, a hard or optical disk.

The computing device 102 can also include computer-executable instructions 112 stored on the memory 106, as shown in FIG. 5. The computer-executable instructions 112, when executed on the microprocessor 104, cause the computing device 100 to evaluate the ability of the company to repay a loan issued by the bank in accordance with the method 10 descried above. The computer-executable instructions 112 can also reside on a removable computer-readable data-storage medium (not shown), such as a hard or optical disk.

A data base 113 stored on the memory 106 can contain the data extracted from the payment records in the financial account of the borrower.

The computing device 102 can also include a user interface adapter 116 and a display adapter 117 communicatively coupled to the microprocessor 104 by way of the bus 105. The computing device 102 can interface with a communications network 118 using a suitable communications device 118 such as a network card or modem. The communications network 119 can facilitate communications between the computing device 102 and other computing devices within the system 100, within the lending institution, or outside of the lending institution.

The computing device 102 can include user interface devices such as a keypad 121 and a mouse 122, each of which is communicatively coupled to the user interface adapter 116; and a display device 126, such as a liquid crystal display (LCD) screen or monitor, communicatively coupled to the display adapter 117.

The system 100 can also include one or more user stations that facilitate remote access to the computing device 102 via the communications network 119, as shown in FIG. 4.

Specific details of the computing device 102 are provided for exemplary purposes only. Computing devices having hardware and software architecture other than that described above can be used in lieu of the computing device 102.

The use of a single computing device 102 in the system 100 is specified for exemplary purposes only. Alternative embodiments can be configured with multiple computing devices 102.

The foregoing description is provided for the purpose of explanation and is not to be construed as limiting the invention. Although the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, can make numerous modifications to the invention as described herein, and changes may be made without departing from the scope and spirit of the invention as defined by the appended claims.

What is claimed is:

1. A computing device for evaluating an ability of a borrower to repay a loan, the borrower having a transaction account having payment records associated therewith, the payment records showing, on a daily basis, individual cash inflows or outflows for individual financial transactions, comprising:

a processor;

memory communicatively coupled to the processor; and computer-executable instructions stored on the memory, wherein the computer-executable instructions, when executed by the processor, cause the computing device to:

access the payment records;

analyze the payment records and segregate the payment records into the individual cash inflows and outflows associated with the individual financial transactions;

determine a daily total cash inflow for each day within a plurality of days within a past period of time by summing the individual cash inflows for each day within the plurality of days within the past period of time;

determine a daily total cash outflow for each day within the plurality of days within the past period of time by summing the individual cash outflows for each day within the plurality of days within the past period of time;

determine daily net cash flows for the borrower over the past period of time by subtracting the daily total cash outflow from the daily total cash inflow for each day within the plurality of days within the past period of time;

smooth at least one of the daily net cash flows, the daily total cash inflows, and the daily total cash outflows to reduce day to day variations therein;

determine a trend of cash flow for the borrower over the past period of time based on at least one of the smoothed daily net cash flows, daily total cash inflows, and daily total cash outflows;

project at least one of the daily net cash flow, daily total cash inflow, and daily total cash outflow of the borrower over a period of time subsequent to the past period of time based on the trend of cash flow for the borrower over the past period of time; and classify the borrower as belonging to a predetermined risk group based on the projection of the cash flow and a predetermined criterion.

2. The computing device of claim 1, wherein the predetermined criterion is a predetermined set of relationships between trends in at least one of the projected daily total cash inflow, daily total cash outflow, and daily net cash flow for the borrower.

3. The computing device of claim 1, wherein the computer-executable instructions, when executed by the processor, further cause the computing device to determine whether a cash flow of the borrower at a point in time agrees with the trend of cash flow at the point in time to within a second predetermined criterion and, if not, evaluate whether changes in the operating condition of the borrower have occurred.

4. The computing device of claim 1, wherein the computer-executable instructions, when executed by the processor, cause the computing device to determine a trend of cash flow for the borrower over the past period of time based on at least one of the smoothed daily net cash flows, daily total cash inflows, and daily total cash outflows by calculating a curve fit based on at least one of the smoothed daily net cash flows, daily total cash inflows, and daily total cash outflows.

5. The computing device of claim 1, wherein the computer-executable instructions, when executed by the processor, further cause the computing device to determine whether the cash flow of the borrower based on the most recent information stored in the transaction account agrees with the trend of cash flow to within a second predetermined criterion.

6. The computing device of claim 1, wherein the computer-executable instructions, when executed by the processor, further cause the computing device to assess one or more of the following with respect to the loan:

a multiple by which the projected daily net cash flow, daily total cash inflow, or daily total cash outflow of the borrower exceeds a financing cost of the loan;

how long the financing cost of the loan can be paid in view of the projected net cash flow;

how long the financing cost of the loan can be paid in view of the projected daily net cash flow, daily total cash inflow, or daily total cash outflow and a cash balance of the borrower;

the ability of the borrower to pay additional financing based on the net cash flow at the period in time and the projected daily net cash flow, daily total cash inflow, or daily total cash outflow; and the ability of the borrower to pay additional financing based on the net cash flow at the period in time; the projected daily net cash flow, daily total cash inflow, or daily total cash outflow; and the cash balance of the borrower.

7. The computing device of claim 1, wherein the computer-executable instructions, when executed by the processor, further cause the computing device to identify types of expenses of the borrower and compare the types of expenses to the types of expenses normally present in an industry with which the borrower is associated.

8. The computing device of claim 1, wherein the information stored in the transaction account of the borrower includes the most recent information stored in the transaction account of the borrower.

* * * * *